United States Patent
Baumgarten et al.

(10) Patent No.: US 9,072,223 B2
(45) Date of Patent: Jul. 7, 2015

(54) AGRICULTURAL WORKING MACHINE FORWARD TRAVEL REGULATOR

(75) Inventors: Joachim Baumgarten, Beelen (DE); Christoph Bussmann, Harsewinkel (DE); Andreas Wilken, Bissendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1488 days.

(21) Appl. No.: 11/271,063

(22) Filed: Nov. 10, 2005

(65) Prior Publication Data

US 2006/0123757 A1 Jun. 15, 2006

(30) Foreign Application Priority Data

Dec. 9, 2004 (DE) .................. 10 2004 059 543

(51) Int. Cl.
*A01B 63/10* (2006.01)
*A01D 41/127* (2006.01)
*A01D 89/00* (2006.01)

(52) U.S. Cl.
CPC .................. *A01D 41/127* (2013.01)

(58) Field of Classification Search
USPC ....... 56/10.2 G, 10.2 R, DIG. 15; 460/4, 7, 6; 701/50, 93
See application file for complete search history.

(56) References Cited

U.S. PATENT DOCUMENTS

| | | | | |
|---|---|---|---|---|
| 3,354,978 A * | 11/1967 | Budzich | ........................ | 180/243 |
| 3,442,068 A * | 5/1969 | Bulin | ................. | 460/6 |
| 3,514,929 A * | 6/1970 | Cornish et al. | .................... | 460/6 |
| 3,515,144 A * | 6/1970 | Morrison | ........................ | 460/4 |
| 3,606,742 A * | 9/1971 | Wieneke et al. | ................... | 460/4 |
| 3,795,279 A * | 3/1974 | Nelson | ............... | 172/3 |
| 4,343,060 A * | 8/1982 | Hildebrand et al. | .............. | 15/84 |
| 4,376,298 A * | 3/1983 | Sokol et al. | ..................... | 701/34 |
| 4,487,002 A * | 12/1984 | Kruse et al. | ..................... | 460/6 |
| 4,496,105 A * | 1/1985 | Fleming et al. | ................. | 241/32 |
| 4,704,866 A * | 11/1987 | Myers | ............................ | 60/449 |
| 4,727,710 A * | 3/1988 | Kuhn | ........................ | 56/10.2 G |
| 4,893,241 A * | 1/1990 | Girodat et al. | .................. | 701/50 |
| 4,934,985 A * | 6/1990 | Strubbe | .............................. | 460/4 |
| 4,967,544 A * | 11/1990 | Ziegler et al. | ............. | 56/10.2 R |
| 6,315,658 B1 * | 11/2001 | Weber | ............................. | 460/6 |
| 6,681,551 B1 * | 1/2004 | Sheidler et al. | ............ | 56/10.2 G |
| 6,834,484 B2 | 12/2004 | Coers et al. | | |
| 2003/0110748 A1 * | 6/2003 | Coers et al. | ............... | 56/10.2 G |

FOREIGN PATENT DOCUMENTS

EP 1 321 025 A1 6/2003

\* cited by examiner

*Primary Examiner* — Árpád Fábián-Kovács
(74) *Attorney, Agent, or Firm* — Michael J. Striker

(57) ABSTRACT

A self-propelled working machine has working units having adjustable parameters and traveling at a ground speed, and a device for regulating the ground speed according to at least two travel strategies.

15 Claims, 3 Drawing Sheets

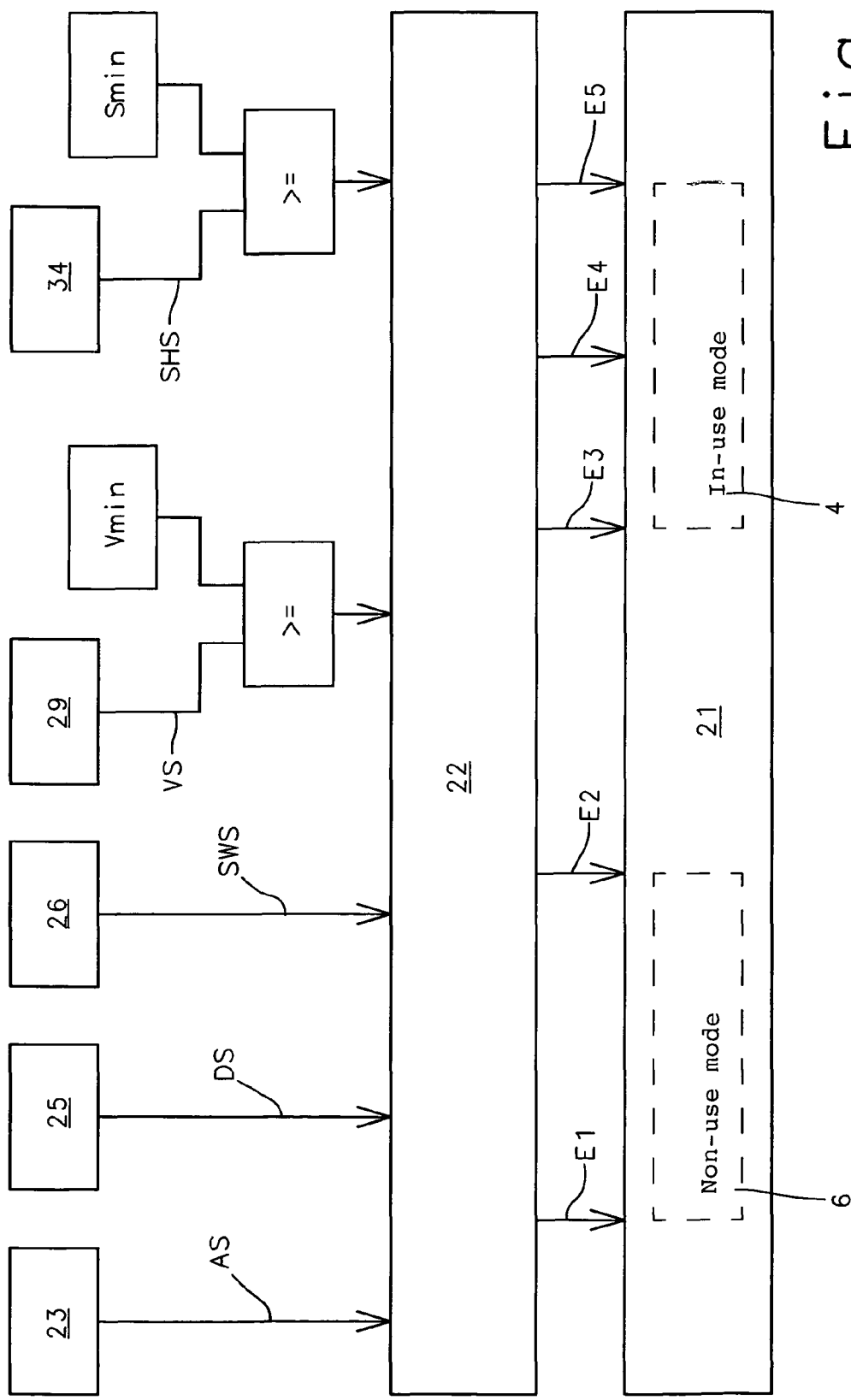

AGRICULTURAL WORKING MACHINE FORWARD TRAVEL REGULATOR

CROSS-REFERENCE

The invention described and claimed hereinbelow is also described in DE 10 2004 059 543.7, filed Dec. 9, 2004. This German Patent Application, whose subject matter is incorporated here by reference, provides the basis for a claim of priority of invention under 35 U.S.C. 119 (a)-(d).

BACKGROUND OF THE INVENTION

The present invention relates to an agricultural working machine.

Publication EP 1 321 025 discloses a combine harvester with an automatic control unit for regulating the forward-travel speed. The control unit changes the forward-travel speed to control the throughput of the combine harvester and is activated as soon as a layer-thickness detector detects the arrival of crop material in a conveying device of the combine harvester.

The disadvantage of this known harvesting machine is that the automatic control changes the forward-travel speed abruptly when the combine harvester enters the crop and the forward-travel regulator is switched on. With known combine harvesters, the forward-travel regulator remains on when the combine harvester leaves the crop or travels through gaps in the field, and it accelerates the combine harvester in order to compensate for the reduced throughput. The driver deactivates the automatic control in these cases and regulates the ground speed manually, e.g., to turn the combine harvester around at the end of the field at an adjusted ground speed. The abrupt change in the ground speed that occurs when the working machine enters or exits the crop often results in overreactions by the driver, who brakes the combine harvester to a standstill as quickly as possible, which causes the combine harvester to rock back and forth. It is also a disadvantage that the combine harvester is not accelerated or decelerated to an optimum entry speed before it enters the crop.

SUMMARY OF THE INVENTION

Accordingly, it is an object of the present invention to provide an agricultural working machine which is a further improvement of the existing machines.

More particularly, it is an object of the present invention to create a harvesting machine with which the forward-travel regulator relieves the driver of the duty to regulate ground speed.

In keeping with these objects and with others which will become apparent hereinafter, one feature of the present invention resides, briefly stated, in a self-propelled working machine, comprising working units having adjustable parameters and traveling at a ground speed; and means for regulating the ground speed according to at least two travel strategies.

The ground speed is regulated according to at least two travel strategies, so that the driver is also relieved of the duty to regulate ground speed in different operating situations. The forward-travel regulator regulates the ground speed such that the combine harvester is neither accelerated nor braked abruptly, so that the driver perceives the change in speed to be comfortable and always has confidence in the automatic regulation.

Due to the fact that the travel strategy is changeable depending on the "non-use" mode or "in-use" mode, the travel-speed regulation is adapted individually to the particular operation.

Advantageously, the regulation of travel speed in the "non-use" mode is decoupled from crop parameters and/or working parameters, so that, in the "non-use" mode, the travel speed can be regulated separately, independently of the crop throughput and/or the efficiency of crop-material preparation.

Due to the fact that the regulation of the travel speed in the "in-use" mode is a function of at least one crop parameter and/or at least one working parameter of the harvesting machine, the ground speed can be set with consideration for a required crop-material throughput and, simultaneously, a required efficiency of crop-material preparation.

Due to the fact that the ground speed is automatically and continuously regulated by a forward-travel regulator, the driver is fully relieved of the duty to regulate ground speed during the entire harvesting operation.

The ground speed is regulated as a function of at least one crop-material parameter and/or at least one working parameter of the working machine when the forward-travel regulator detects that the working machine is in the "in-use" mode, so that the forward-travel regulator takes into account the variables that are relevant to ground speed.

Advantageously, the regulation of ground speed is decoupled from at least one crop-material parameter and/or at least one working parameter when the forward-travel regulator detects that the machine is in the "non-use" mode, so that the forward-travel regulator regulates the ground speed independently of variables, which are irrelevant in this case.

To further relieve the driver of duties and so that the forward-travel regulator automatically changes the travel strategy when the operating conditions change, the forward-travel regulator is connected with one or more sensors and detects, via the signals generated by the sensor(s), whether the working machine is in the "non-use" mode or the "in-use" mode.

The sensor or sensors advantageously detect at least one operating status of the working units, so that the forward-travel regulator detects whether the working units required for the particular operation are switched on or are optimally adjusted.

In a further embodiment of the present invention, the sensor or sensors detect the ground speed and the direction of travel of the working machine so that the forward-travel regulator detects the direction in which the combine harvester is traveling, and whether the combine harvester is traveling at a minimum ground speed, at the least.

The sensor or sensors detect a flow of crop material in the working machine so that the forward-travel regulator "knows" whether the combine harvester is harvesting grain during the harvesting operation.

Advantageously, the ground speed is constant in the "non-use" mode and has a value that nearly corresponds to the value of the ground speed at the end of the "in-use" mode during transition to the "non-use" mode, so that the working machine is neither accelerated nor braked abruptly by the forward-travel regulator.

In an advantageous embodiment of the present invention, the working machine is a combine harvester which, in the "in-use" mode, travels through a crop and, in the "non-use" mode, travels through a turnaround.

If at least one of the signals generated by the sensor(s) depends on a condition defined by the driver that is specific to the "non-use" mode or the "in-use" mode, it can be determined whether the working units required for the particular operation are switched on and/or have the correct setting for the particular operation.

If at least one of the signals generated by the sensor(s) is a function of the position of the working machine, it can be determined, with reference to the path traveled, which part of the field has already been crossed and has therefore been harvested, so that gaps in the crop can be detected before they are traveled through.

In a further advantageous embodiment of the present invention, the signals are evaluated in a control and regulating unit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a schematic depiction of a forward-travel regulator with a control and regulating unit.

DESCRIPTION OF THE PREFERRED EMBODIMENTS

Figure 1:
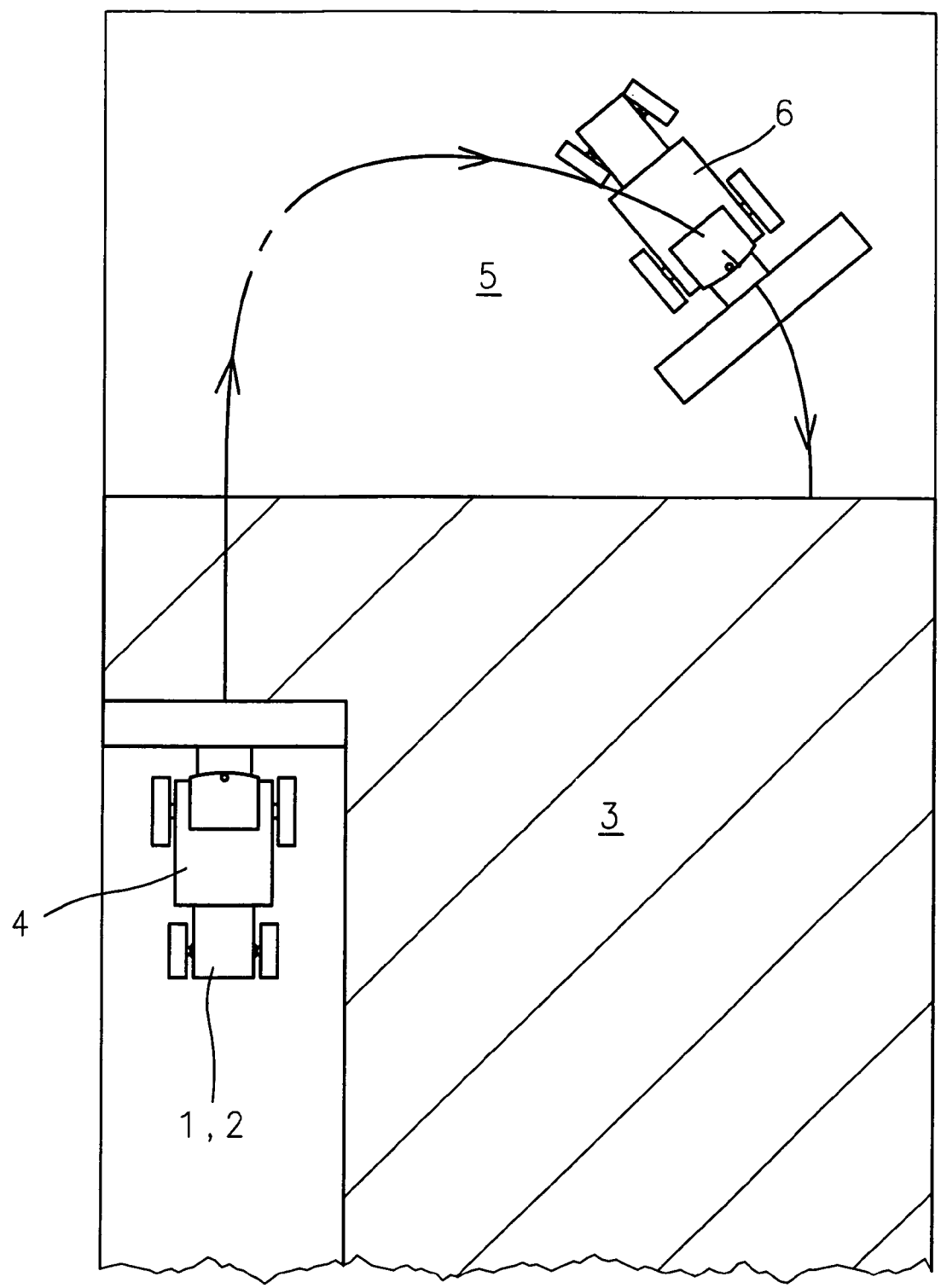
FIG. 1 is a top view of a combine harvester during a harvesting operation in the field.

FIG. 1 shows a working machine 2 configured as a combine harvester 1, during a harvesting operation. When combine harvester 1 travels through crop 3 growing in the field and composed of grain, it is in the "in-use" mode 4, in which it cuts, collects and prepares the grain. As soon as combine harvester 1 leaves crop 3 to turn around in turnaround 5 located outside of crop 3, or if crop 3 contains gaps, combine harvester 1 is in the "non-use" mode, since no grain is present.

Figure 2:
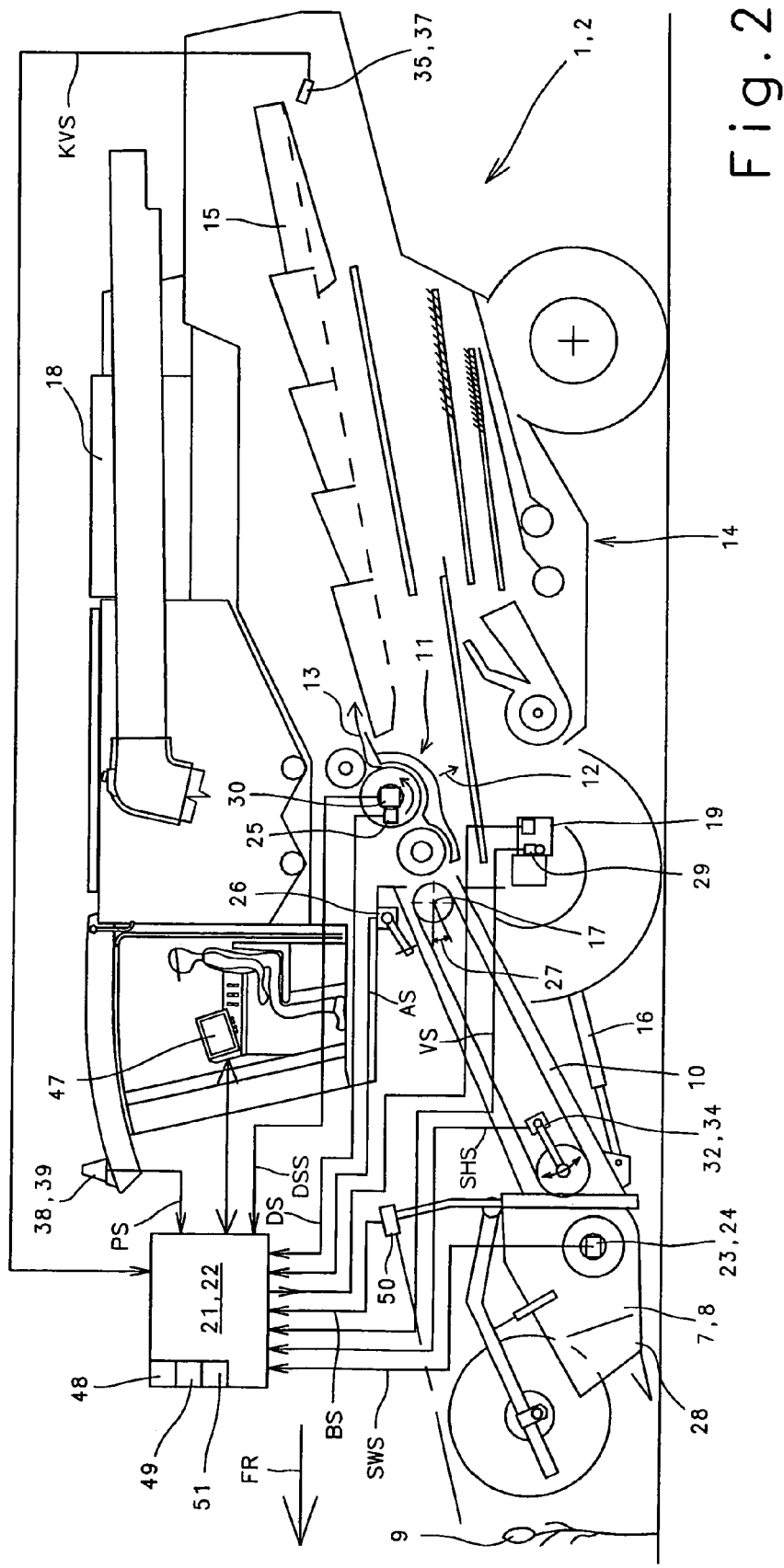
FIG. 2 is a side view of a self-propelled combine harvester according to the present invention.

The self-propelled working machine 2 configured as a combine harvester 1 and shown partially in FIG. 2 includes a front attachment 8 designed as a header 7 that cuts crops 9 growing on the field and subsequently delivers them to a feed rake 10. Feed rake 10 transfers crop material 9 to a downstream threshing mechanism 11 that prepares crop material 9, dividing it into a grain-chaff mixture 12 and a stream of material 13 composed of threshed-out stalks. Grain-chaff mixture 12 is conveyed to a cleaning device 14 that separates the grain from the non-grain components, i.e., stalk and chaff parts. Stream of material 13 composed of threshed-out stalks arrives at a tray-type shaker 15, which conveys steam of material 13 to the rear region of combine harvester 1 and thereby separates out the grain, short straw and chaff contained in stream of material 13, which is also delivered to cleaning device 14.

Feed rake 10 is guided via lifting cylinders 16—which are connected at one end to combine harvester 1 such that they are movable in a swinging manner, and are connected on the piston-rod side with feed rake 10 such that they are movable in a swinging manner—such that it is pivotable around a pivot axis 17 positioned transverse to the direction of travel FR. Combine harvester 1 has an internal combustion engine 18 that drives a ground drive 19 for driving front wheels 20 of combine harvester 1, a threshing mechanism drive for driving threshing mechanism, and a header drive for driving header 7.

Ground drive 19 is equipped with a forward-travel regulator 21 that automatically and continuously regulates ground speed V of combine harvester 1. Forward-travel regulator 21 includes a control and regulating unit 22 that is connected with a plurality of sensors 23, 25, 26, 29, 30, 34, 37, 39, 50 located on combine harvester 1 and header 7.

A crop sensor 50 is located on the front end of header 7, which senses the crop located in front of combine harvester 1 in the direction of travel FR. Crop sensor 50 generates crop signals BS as a function of the amount of growth in the field. A further sensor 23 monitors an on/off switch 24 for threshing mechanism 11 and generates a threshing mechanism signal DS as a function of the operating status of threshing mechanism 11. A third sensor 25 monitors an on/off switch 24 for header 7 and generates a header signal SWS as a function of the operating status of header 7.

An angle-of-rotation sensor 26 is located in the pivot axis 17 of feed rake 10 and detects, in a manner known per se, an angle of rotation 27 between feed rake 10 and combine harvester 1. At a certain angle of rotation 27, in which header 7 assumes a working position 28, angle-of-rotation sensor 26 generates a working position signal AS.

A rotational speed sensor 29 is located on ground drive 19; it detects, in a manner known per se, ground speed V and direction of travel FR of combine harvester 1. Rotational speed sensor 29 generates a ground-speed signal VS that is proportional to ground speed V when combine harvester 1 is traveling in a forward direction.

A throughput sensor 30 is located on the threshing mechanism drive in a manner known per se and detects a cylinder torque that is a function of the throughput of crop material through threshing mechanism 11. Throughput sensor 30 generates a throughput signal DSS that is proportional to the throughput of crop material through threshing mechanism 7.

Feed rake 10 includes a layer-thickness detector 32 that is known per se, which detects the thickness of the layer of crop material in feed rake 10. Layer-thickness detector 32 includes a sensor 34 that generates a layer-thickness signal SHS that is proportional to the thickness of the crop material layer.

A grain-flow measuring device 35 is located at the end of tray-type shaker 15, which senses a loss due to separation. Grain-flow measuring device 35 includes a plurality of knock sensors 37 that generate grain-loss signals KVS in a manner known per se, the grain-loss signals KVS being proportional to the loss due to separation.

The combine harvester is also equipped with a position detector 38 that senses the position of combine harvester 1. Position detector 38 includes sensors 39 that generate a position signal PS that is a function of the location of combine harvester 1.

FIG. 3 is a schematic illustration of forward-travel regulator 21 with control and regulating unit 22 and a portion of sensors 23, 25, 26, 29, 30, 34, 37, 39, 50 connected to control and regulating unit 22.

Control and regulating unit 22 compares the layer-thickness signals SHS generated by sensors 34 with a specified minimum layer thickness $S_{MIN}$. If the determined layer thickness is equal to or greater than the minimum layer thickness $S_{MIN}$, control and regulating unit 22 generates an "in-use" mode signal E5, which is transmitted to forward-travel regulator 21. When "in-use" mode signal E5 is received, forward-travel regulator 21 detects that combine harvester 1 is in "in-use" mode 4. If forward-travel regulator 21 does not receive "in-use" signal E5, forward-travel regulator 21 detects that the combine harvester is in "non-use" mode 6.

To increase the quality of detection, an embodiment is feasible in which forward-travel regulator 21 detects, e.g., "in-use" mode 4 and "non-use" mode 6 only when further "in-use" mode signals E1-E4 are transmitted to forward-travel regulator 21.

Control and regulating unit 22 compares threshing mechanism signal DS generated by sensor 25 with a specified switch-on value and thereby determines the operating state of threshing mechanism 11. If threshing mechanism 11 is switched on, control and regulating unit 22 generates a first "in-use" mode signal E1.

It is also feasible that control and regulating unit 22 compares header signal SWS generated by sensor 23 with a switch-on value for header 7 and thereby determines the operating state of header 7. If header 7 is switched on, control and regulating unit 22 generates a second "in-use" mode signal E2.

It is also feasible that control and regulating unit 22 compares working position signal AS generated by angle-of-rotation sensor 26 with a specified working position value and thereby determines working position 28 of header 7. If header 7 is in working position 28, control and regulating unit 22 generates a third "in-use" mode signal E3.

It is also possible that control and regulating device 22 compares ground speed signals VS generated by rotational speed sensor 29 with a ground speed and detects whether combine harvester 1 is traveling at a minimum ground speed $V_{MIN}$. If the ground speed of combine harvester 1 is equal to or greater than minimum ground speed $V_{MIN}$, control and regulating unit 22 generates a fourth "in-use" mode signal E4.

In a further embodiment of the present invention, it is feasible that forward-travel regulator 21 is connected via control and regulating unit 22 with crop sensor 50, and forward-travel regulator 21 detects—as a function of crop signals BS generated by crop sensor 50—whether combine harvester 1 is traveling in the crop or outside the crop, i.e., whether combine harvester 1 is in the "non-use" mode 6 or "in-use" mode 4.

It is also feasible that forward-travel regulator 21 is connected with position detector 38, and that forward-travel regulator 21 detects—depending on the path already traveled, the cutting width of header 7 and a map of cutting areas—whether the combine harvester is in "non-use" mode 6 or "in-use" mode 4.

According to the present invention, ground speed V of combine harvester 1 is regulated as a function of "in-use" mode 4 or "non-use" mode 6 according to various travel strategies.

When forward-travel regulator 21 detects that combine harvester 1 is in "in-use" mode 4, forward-travel regulator 21 regulates ground speed V as a function of a crop parameter, such as the loss due to separation determined by grain-flow measuring device 35 and/or a working parameter of combine harvester 1, such as the thickness of the layer of crop material in feed rake 10.

Using a control unit 47 connected with forward-travel regulator 21, the driver specifies a grain-loss limit 48 with which forward-travel regulator 21 calculates a setpoint layer thickness for feed rake 10. Forward-travel regulator 21 regulates ground speed V such that the layer thickness reaches the calculated setpoint layer thickness 49. Forward-travel regulator 21 compares the loss due to separation with grain-loss limit 48. If the loss due to separation is greater than grain-loss limit 48 for longer than a certain length of time, ground speed V is reduced until the loss due to separation corresponds to grain-loss limit 48 and, simultaneously, a new setpoint layer thickness 49 is specified. If the loss due to separation is lower than grain-loss limit 48 for longer than a certain length of time, ground speed V is increased until the loss due to separation corresponds to grain-loss limit 48. Forward-travel regulator 21 updates the layer thickness by continually changing ground speed V during "in-use" mode 4 to adapt to the different harvesting conditions.

When forward-travel regulator 21 detects that combine harvester 1 is in "non-use" mode 6, the regulation of ground speed V by forward-travel regulator 21 is decoupled from crop parameters and/or working parameters of combine harvester 1. Ground speed V in "non-use" mode 6 can be controlled using any characteristic curve in forward-travel regulator 21. In a first embodiment of the present invention, the ground speed is nearly constant and has a value that nearly corresponds to the value of ground speed V at the end of "in-use" mode 5 during transition to "non-use" mode 6 when combine harvester 1 leaves the crop. It is also possible to brake or accelerate the combine harvester to an entry speed before it enters the crop.

As soon as header 7 and/or threshing mechanism 11 is switched off and/or header 7 is swiveled out of working position 28 and/or combine harvester 1 travels slower than the minimum ground speed $V_{MIN}$, this means the combine harvester is in neither "in-use" mode 4 or "non-use" mode 6, and one or more "in-use" mode signals E1-E4 are not transmitted to forward-travel regulator 21, then forward-travel regulator 21 switches off and the driver regulates ground speed V manually using control lever 51. It is also possible, however, for driver to deactive forward-travel regulator 21 by actuating control lever 51.

A display in the display units indicates to the driver whether combine harvester 1 is in "in-use" mode 4 or "non-use" mode 6, and travel strategy forward-travel regulator 21 uses to regulate ground speed V of combine harvester 1.

It is within the scope of the ability of one skilled in the art to modify the exemplary embodiments described in a manner not presented, or to use them in other machines to achieve the effects described, without leaving the framework of the invention.

The present invention could also be used, e.g., with a tractor with at least one working device attached. The working device could be, e.g., a plow that, in a lowered position in an "in-use" mode, engages in the ground and, in a raised position in a "non-use" mode, is located above the ground.

It will be understood that each of the elements described above, or two or more together, may also find a useful application in other types of constructions differing from the types described above.

While the invention has been illustrated and described as embodied in an agricultural working machine, it is not intended to be limited to the details shown, since various modifications and structural changes may be made without departing in any way from the spirit of the present invention.

Without further analysis reveal the foregoing will so fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:
1. A self-propelled working machine traveling at a ground speed, comprising:
a plurality of working units having adjustable parameters; and
a forward-travel regulator automatically and continuously regulating the ground speed according to at least two travel strategies so that each of the at least two travel strategies is changeable depending on one of a "non-use" mode and an "in-use" mode of the working machine.

2. A self-propelled working machine as defined in claim 1, wherein the forward-travel regulator is configured so that a regulation of the ground speed in the "non-use" mode is decoupled from parameters selected from a group comprising at least one of a plurality of crop parameters and a plurality of working parameters of the working machine.

3. A self-propelled working machine as defined in claim 1, wherein the forward-travel regulator is configured so that the ground speed in the "in-use" mode is carried out as a function of a parameter selected from a group comprising at least one of a plurality of crop parameters and a plurality of working parameters of the working machine.

4. A self-propelled working machine as defined in claim 1, wherein said forward-travel regulator is configured to regulate the ground speed as a function a parameter selected from a group comprising at least one of a plurality of crop parameters and a plurality of working parameters of the working machine when said forward-travel regulator detects that the working machine is in the "in-use" mode.

5. A self-propelled working machine as defined in claim 1, wherein said forward-travel regulator is configured to carry out a regulation of the ground speed that is decoupled from parameters selected from a group comprising at least one of a plurality of crop parameters and a plurality of working parameters of the working machine when said forward-travel regulator detects that the working machine is in the "non-use" mode.

6. A self-propelled working machine as defined in claim 1, further comprising at least one sensor, wherein said forward-travel regulator is connected with said at least one sensor and detects, by evaluating signals generated by said at least one sensor, whether the working machine is in the "non-use" mode or in the "in-use" mode.

7. A self-propelled working machine as defined in claim 6, wherein said at least one sensor is configured so that it detects at least one operating status of said working units of the working machine.

8. A self-propelled working machine as defined in claim 6, wherein said at least one sensor is configured so that it detects the ground speed and a direction of travel of the working machine.

9. A self-propelled working machine as defined in claim 6, wherein said at least one sensor is configured so that it detects a crop-material throughput in the working machine.

10. A self-propelled working machine as defined in claim 1, wherein the working machine is a combine harvester that is configured to travel through a crop in the "in-use" mode and travel through a turnaround in the "non-use" mode.

11. A self-propelled working machine as defined in claim 6, wherein said at least one sensor is configured so that at least one of the signals generated by said at least one sensor depends on a condition defined by a driver that is specific to the "non-use" mode or the "in-use" mode.

12. A self-propelled working machine as defined in claim 6, wherein said at least one sensor is configured so that at least one of signals generated by said at least one sensor is a function of a position of the working machine.

13. A self-propelled working machine as defined in claim 6, and further comprising a control and regulating unit evaluating the signals generated by said at least one sensor.

14. A self-propelled working machine traveling at a ground speed, comprising:
   a plurality of working units having adjustable parameters;
   means for sensing at least two modes of the working machine including a "non-use" mode and an "in-use mode"; and
   a forward-travel regulator automatically and continuously regulating the ground speed according to at least two travel strategies changeable depending on one of the "non-use" mode and the "in-use" mode in response to information received from said sensing means.

15. A self-propelled working machine traveling at a ground speed, comprising:
   a plurality of working units having adjustable parameters; and
   a forward-travel regulator automatically and continuously regulating the ground speed according to at least two travel strategies so that each of the at least two travel strategies is changeable depending on one of a "non-use" mode and an "in-use" mode of the working machine, and so that the ground speed in the "non-use" mode is constant and has a value that substantially corresponds to the value of the ground speed at an end of the "in-use" mode during transition to the "non-use" mode, whereby the working machine is neither accelerated nor braked abruptly by said forward-travel regulator.

* * * * *